United States Patent [19]

Audoin et al.

[11] Patent Number: 5,703,845
[45] Date of Patent: Dec. 30, 1997

[54] READING DEVICE WITH CROSS-TALK CORRECTION OF TWO SIGNAL TRAINS

[75] Inventors: Michel Audoin, Villeneuve St Georges; Bertrand Moreau, Plougonvelin; Joseph Colineau, Bures sur Yvette, all of France

[73] Assignee: Thomson-CSF, Paris, France

[21] Appl. No.: 559,319

[22] Filed: Nov. 15, 1995

[30] Foreign Application Priority Data

Nov. 25, 1994 [FR] France ................... 94 14147

[51] Int. Cl.$^6$ ................... G11B 7/00
[52] U.S. Cl. ............ 369/44.41; 369/124; 369/54; 369/120; 386/115
[58] Field of Search ............... 369/107, 111, 369/44.37, 44.41, 124, 48, 49, 54, 120.95; 360/47, 63, 22, 53, 77.02, 77.06; 395/484; 371/70; 358/328, 340, 342; 386/115, 126, 22; 250/208.2, 208.3

[56] References Cited

U.S. PATENT DOCUMENTS

| 3,919,716 | 11/1975 | Yumde | 360/35.1 |
|---|---|---|---|
| 4,750,180 | 6/1988 | Doyle | 360/53 |
| 5,084,858 | 1/1992 | Maeda | 369/124 |
| 5,086,423 | 2/1992 | Streit | 370/6 |
| 5,153,872 | 10/1992 | Maeda | 369/124 |
| 5,341,387 | 8/1994 | Nguyen | 371/45 |
| 5,483,515 | 1/1996 | Cheng | 369/124 |
| 5,493,553 | 2/1996 | Maurice | 369/109 |
| 5,568,456 | 10/1996 | Hayoshi et al. | 369/124 X |

FOREIGN PATENT DOCUMENTS

| 0 400 678 | 12/1990 | European Pat. Off. . | |
| 2630853 | 11/1989 | France | 360/110 |
| 2656723 | 7/1991 | France | 369/13 |
| WO 94/15334 | 7/1994 | France . | |
| WO 94/15335 | 7/1994 | France . | |

OTHER PUBLICATIONS

Patent Abstracts of Japan, vol. 15, No. 245 (P-1218) Jun. 24, 1991 & JP-A-03 077 082 (Mitsubishi Electric Corp.) Apr. 2, 1991—abridged.
Patent Abstracts of Japan, vol. 10, No. 65 (E-388) Mar. 14, 1986 & JP-A-60 216 666 (Sharp K.K.) Oct. 30, 1995.
Database WPI, Section EI, Week 9208, Derwent Publications Ltd., London, GB; Class W02, AN 92-064560 & US-A-5 086 423 (US. SEC. of Navy) Feb. 4, 1992.

*Primary Examiner*—Aristotelis M. Psitos
*Assistant Examiner*—Alan Faber
*Attorney, Agent, or Firm*—Oblon, Spivak, McClelland, Maier & Neudstadt, P.C.

[57] ABSTRACT

A reading head has odd and even elemental areas for reading corresponding odd and even information segments that alternate to make up a frame of information on a record medium. The odd elemental areas provide a train of sequential odd information segments, each odd segment having cross-talk associated with the neighboring even segments which are on either side thereof when it is read from the record medium. Similarly, the even elemental areas provide a train of even information segments, each even segment having cross-talk associated with the odd segments which neighbored it on either side when it is read from the record medium. To correct for such cross-talk in both signal trains, both are fed to each of two cross-talk correcting circuits. These circuits derive needed adjacent segment information as to the cross-talk producing adjacent segments from one of the trains being fed thereto so as to process the segments of the other train being fed thereto for cross-talk correction.

9 Claims, 9 Drawing Sheets

READING DEVICE WITH CROSS-TALK CORRECTION OF TWO SIGNAL TRAINS

BACKGROUND OF THE INVENTION

The invention relates to a reading device and system.

The invention can be applied in particular to the reading of magnetic or optical recordings and, in this context, to the reading of recordings in recording systems such as computer peripherals and all types of professional systems.

It can be extended to recordings on optical tape and magnetic or optical disks when it is necessary to read several adjacent information elements thereon in parallel.

In addition to possible distortion in each of the information elements, the high-density parallel recording of information generally causes disturbance (or cross-talk) when the information elements are very close to one another. It is then necessary to correct the cross-talk to optimize the performance characteristics of the system.

The French patent application No. 92 15474 describes a system for the correction of cross-talk in a system for the reading of multiple-track recordings. High-density recording on parallel tracks raises a twofold problem in re-reading: these are track following and track separation. The small width of the tracks (less than 20 μm) means that it is difficult, on a tape reader, to ensure the precision of the track-following operation on the basis solely of the mechanical guidance of the edge of the tape. The need to ensure the inter-operational quality of the tapes and readers increases this difficulty.

Figure 1:
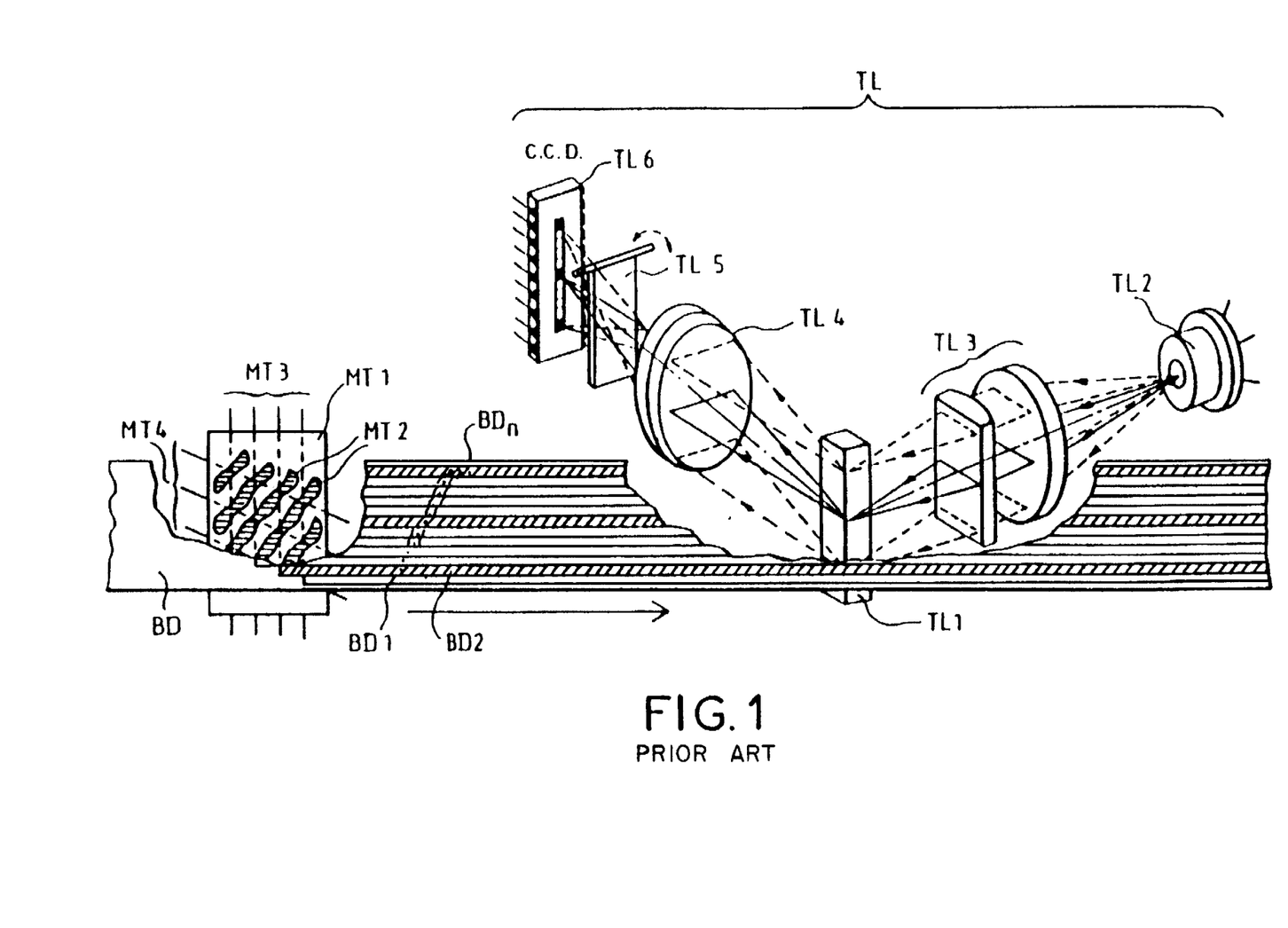
FIG. 1 shows a magnetic tape recording-reading system in which the reading is done with a magneto-optical system.
Figure 2:
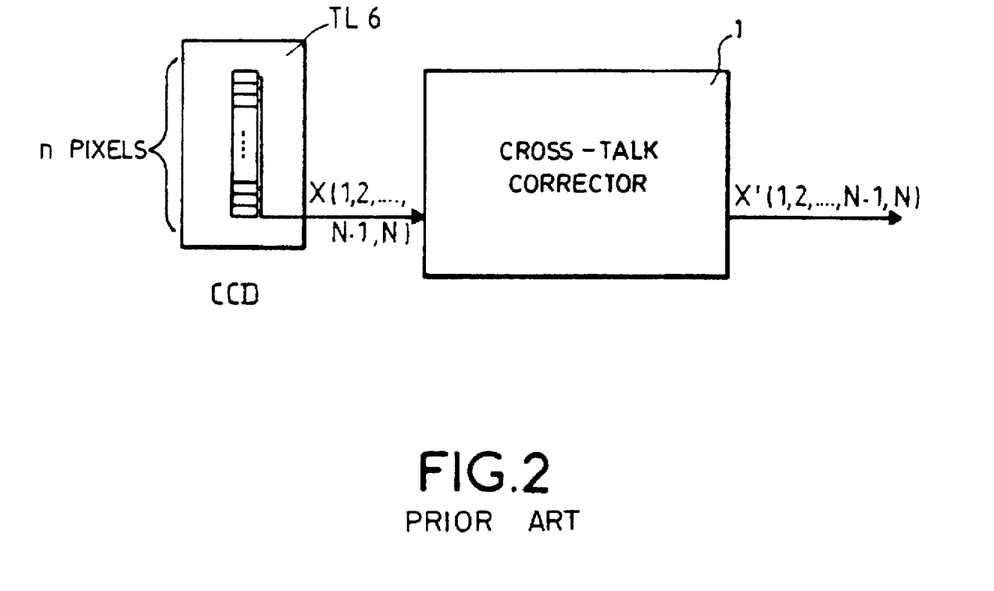
FIG. 2 shows a corrector of cross-talk in the prior art system.

Referring to FIG. 1 it can be seen that, in a system such as this, several tracks BD1-BDn are read simultaneously by means of a magneto-optical system TL using a linear CCD sensor TL6. The cross-talk from the first neighboring tracks of each track is computed in real time. FIG. 2 shows that the N information elements on the tracks BD1-BDn are read by the CCD sensor TL6 and received by a cross-talk corrector 1. Since the train of samples in series X corresponds to consecutive tracks BD1-BDn, it is arranged according to the sequence 1, 2, ..., N−1, N, 1, 2, ... if the number of tracks analyzed is N. The corrector corrects the cross-talk in real time in taking account of the previously computed coefficients and of the known values of disturbance-causing neighbors and transmits a train of corrected samples X'. This system therefore enables the cross-talk coming from the first neighboring tracks to be eliminated.

However, in a recording system such as this, the linear CCD sensor, through its optical/electronic transfer characteristics, sets the overall electrical performance values and, especially, the bit rate of the device. To obtain higher information bit rates, it is therefore necessary to increase the scanning rate of the CCD.

It is an object of the invention to increase the bit rate of the system and hence increase the processing speed.

For this purpose, the width of the frame of samples, namely the time between the reading of the same track, is reduced. This can be done by reducing the number of photodetectors associated with each output. For example, to double the sample rate, the pixels are classified under two groups depending on the parity of their rank or level. Then, at the output of a CCD with N pixels, there are obtained two simultaneous frames formed by N/2 samples corresponding to the N/2 photodiodes of each group. A CCD sensor with a high bit rate is therefore used, with its outputs differentiated for the even-parity ranking and odd-parity ranking photodetectors. It may be recalled that the basic principle of cross-talk correction in the French patent application No. 92 15474 can be applied for a single train of samples in series corresponding to consecutive tracks and therefore ordered according to the sequence 1, 2, ..., N−1, N, 1, 2, ... should N tracks be analyzed while the CCD sensors with high bit rates produce two frames of samples in series ordered according to the sequence 2, 4, ..., N−2, N, 2, 4, ... for the even-parity trains and 1, 3, 5, ..., N−1, 1, 3, ... for the odd-parity trains. There therefore arises a problem of use of the CCD sensors with even-parity/odd-parity outputs. Another problem therefore arises. This is the problem of correcting cross-talk on multiple-train signals.

To process these multiple-train signals, the invention uses a cross-talk correction circuit for each train. Each circuit is essentially the same as the one already used in the system with only one frame as described in the French patent application No. 92 15474. However, since at least three samples are needed at the input of the correction operator, corresponding to a central track and to its two neighbors to the right and to the left, it is necessary to have samples of the neighboring tracks available, these samples belonging, for their part, belong to the different trains. The correction circuits will then provide for the management of the intersecting passageways between the trains of samples to have accurate information available at, the appropriate instant.

SUMMARY OF THE INVENTION

The invention therefore relates to a device for the reading of a recording medium comprising at least one frame of information elements arranged side by side on the information medium and comprising:

a reading means carrying out the parallel reading of the frame of information elements and supplying a train of samples in series corresponding to the information elements on the recording medium; and a cross-talk correction circuit correcting the cross-talk on a central sample by means of the neighboring samples;

wherein:

the reading means are adapted to provide at least one first train of samples and one second train of samples in series designed to be combined alternately; and comprising:

a cross-talk correction circuit for each train of samples, each circuit receiving samples to be corrected from one first train of samples and samples from at least one second train of samples.

BRIEF DESCRIPTION OF THE DRAWINGS

The various objects and features of the invention shall appear more clearly from the following description, and from the appended figures of which.

DETAILED DESCRIPTION OF THE PREFERRED EMBODIMENTS

Referring to FIG. 1, a description shall be given first of all of a recording/reading system to which the invention can be applied.

This system has a recording medium such as a magnetic tape BD. A matrix recording head MT1 has a matrix of elementary heads MT1 controlled by row selection conductors MT3 and data selection conductors MT4. This head enables the recording, on the tape BD, of different tracks of information elements BD1, BD2, . . . , BDn each corresponding to an elementary head of the matrix head MT1. This recording head is of the type described for example in the French patent application No. 88 05592.

The right-hand part of the figure shows a magneto-optical reading head TL such as that of the French patent application No. 89 17313.

This head TL has a magneto-optical transducer TL1 (working by Kerr effect for example) positioned in parallel to the plane of the magnetic tape, the big length of which is transversal to the length of the tape. A light source TL2, by means of a polarized light beam and through a focusing system TL3, illuminates the transducer TL1 in such a way that the light beam is focused substantially along a line on one face of the transducer TL1 in the vicinity of the magnetic tape BD. The beam reflected by the transducer TL1 has its polarization modified as a function of the magnetic field on the tape. The reflected beam is transmitted by a focusing system TL4 and a track-following system TL5 to an optoelectronic detector TL6 comprising, for example, a CCD type charge transfer device.

The detector TL6 has at least as many detector elements as there are tracks on the tape. The transducer TL1 reflects a beam towards the detector TL6. This beam is actually formed by a set of track reading beams each having had its polarization influenced by a track of the magnetic tape. All these reading beams are received by the detector TL6 which thus enables the detection of the information elements read on each track of the tape BD.

The magneto-optical transducer is not etched and has a continuous reading structure. This may contribute to cross-talk in reading. It remains fixed and it is the track-following system TL5 that makes it possible, by deflecting the beam, to provide for dynamic track following.

It is also possible to envisage a direct mechanical shifting of the CCD along its axis.

The optical system may be designed so that each track read is analyzed by one and the same photodiode.

It must be noted that it is advantageous not to shift the mechanical element in contact with the tape (the transducer).

Figure 3:
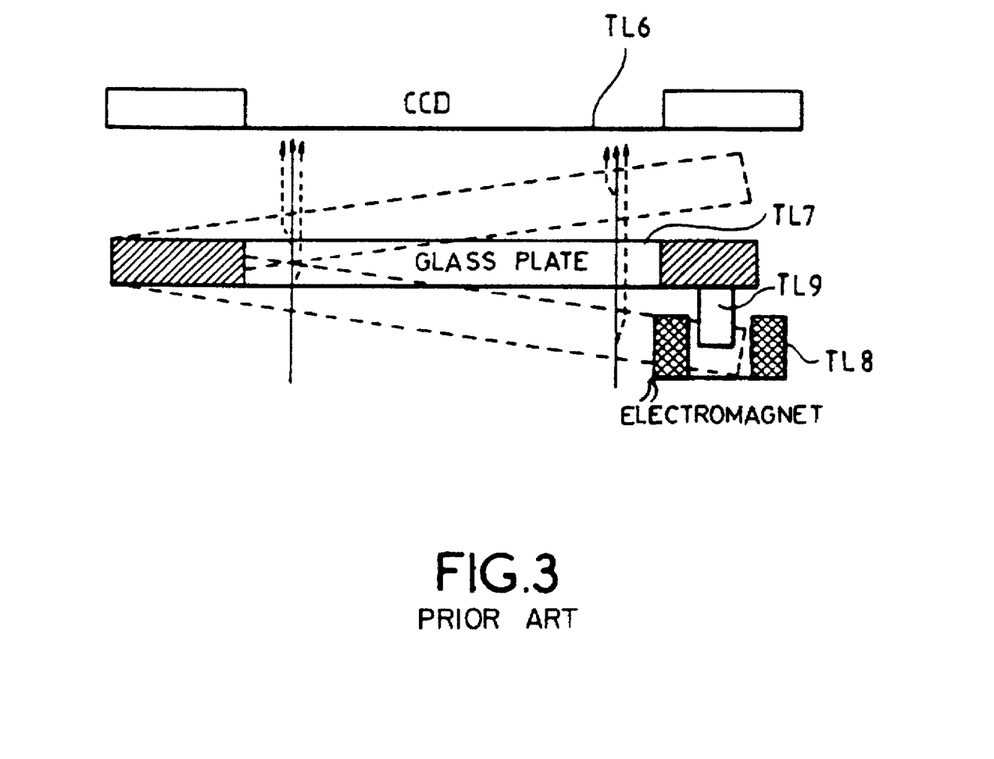
FIG. 3 shows a track-following system.

The track-following system TL5 may be made as shown in FIG. 3. It has a glass plate with a parallel face TL7 positioned substantially in parallel to the detector TL6 and rotating about an axis perpendicular to the greatest length of the transducer TL1. The rotation is controlled by an electromagnet TL8 and a solenoid plunger TL9 fixedly joined to the plate TL7. The electromagnet receives electrical track-following information and enables the plate to be oriented so as to appropriately deflect the beam coming from the transducer TL1 to the detector TL6 and allocate a track-reading beam transmitted by the transducer TL1 to each photodiode.

The control of the plate TL7 can also be provided by any device such as a piezoelectric device. The track-following system can also be provided by the shifting of the detector TL6, the optical system TL4 and the transducer TL1 with respect to one another.

Figure 4:
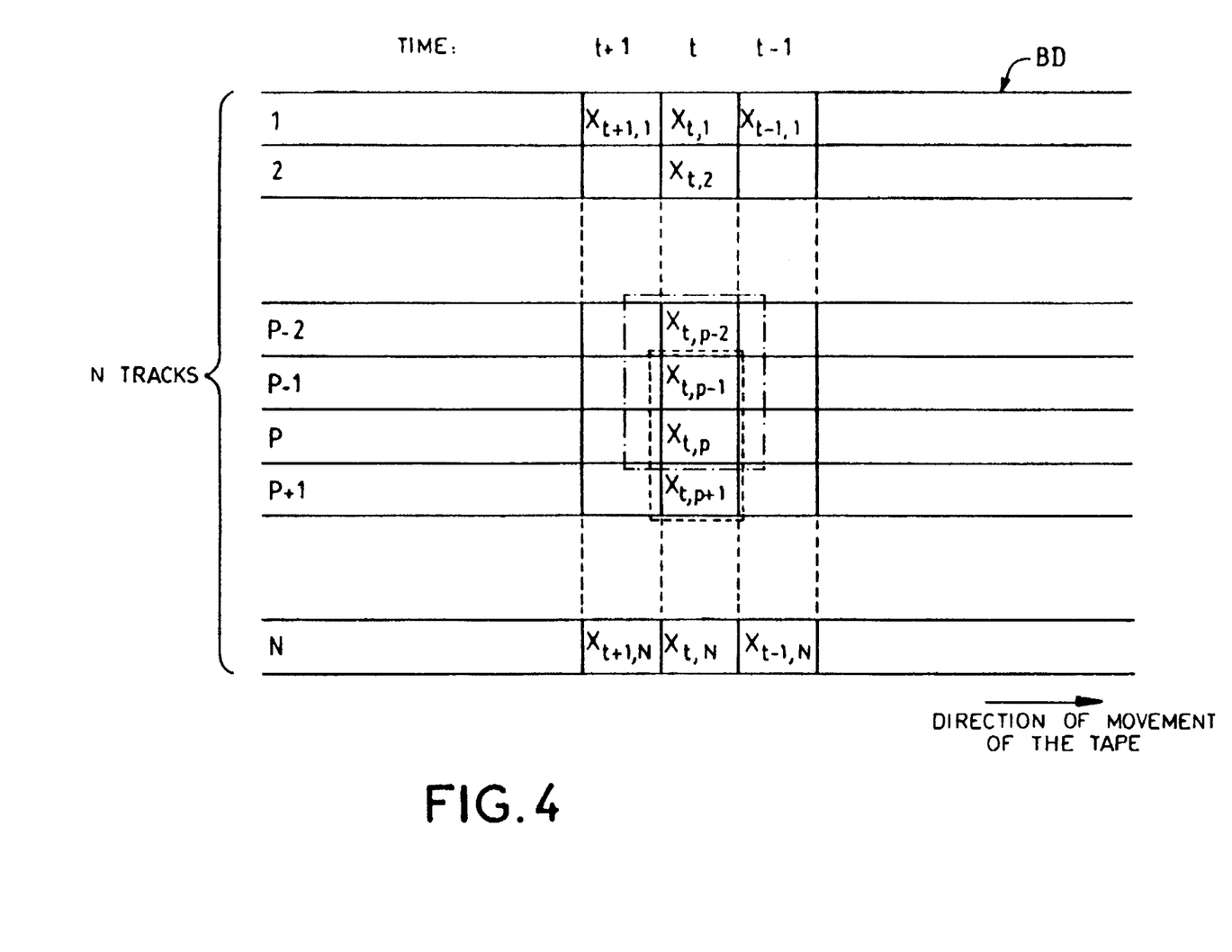
FIG. 4 exemplifies the organization of the information elements and the tracks on a magnetic tape.

Referring to FIG. 4, a description shall now be given of an exemplary arrangement of the information elements and tracks on the magnetic tape BD in FIG. 1. At the point in time t, the sensor reads the information samples $Xt,1$, $Xt,2$, ..., $Xt,p-1$, $Xt,p$, $Xt,p+1$, ..., $Xt,N$. According to this simplified example, it will be assumed that these samples of information elements which correspond to a frame of input pixels had been recorded in parallel by the recording head MT1. However, the pixels coming from an input frame may be recorded in a staggered way and may, at the time of reading, be over-sampled in such a way that the information elements in the frame read at the instant t do not correspond to the information of the input frame. This does not change the principle of the invention.

Figure 5:
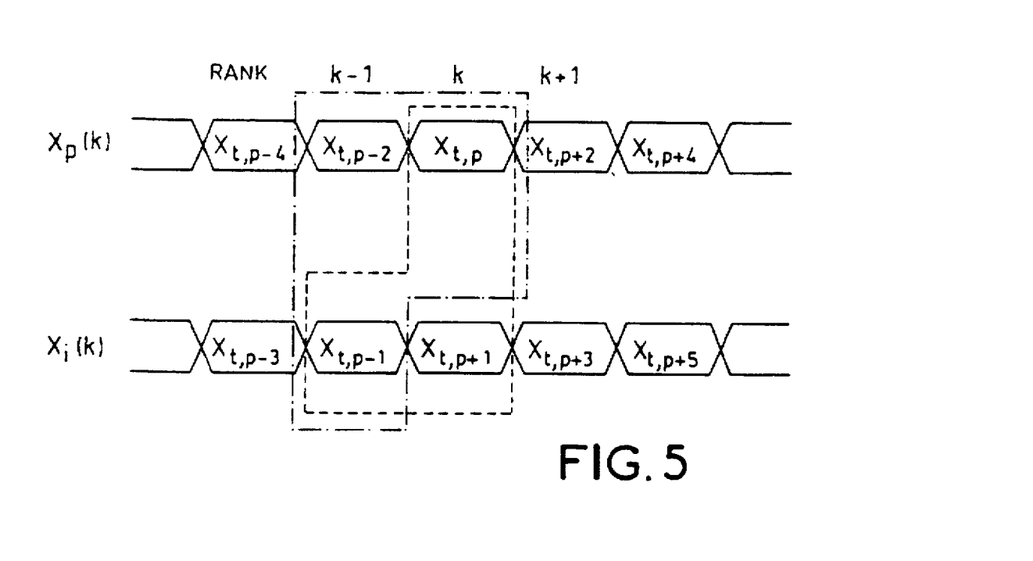
FIG. 5 exemplifies the organization of the information elements at the output of the CCD sensor.

Furthermore, it will be assumed that, for the frame at the instant t, the high bit rate CCD sensor TL6 will read the N tracks and produce an even-parity sample train in series $Xp(k)$ and an odd-parity sample train in series $Xi(k)$ sequenced in the manner shown in FIG. 5. This means that, at the instant k, which shall be called the rank k, the sample $Xt,p$ and the sample $Xt,p+1$ are available at the output of the sensor in the even-parity and odd-parity trains respectively.

Figure 6:
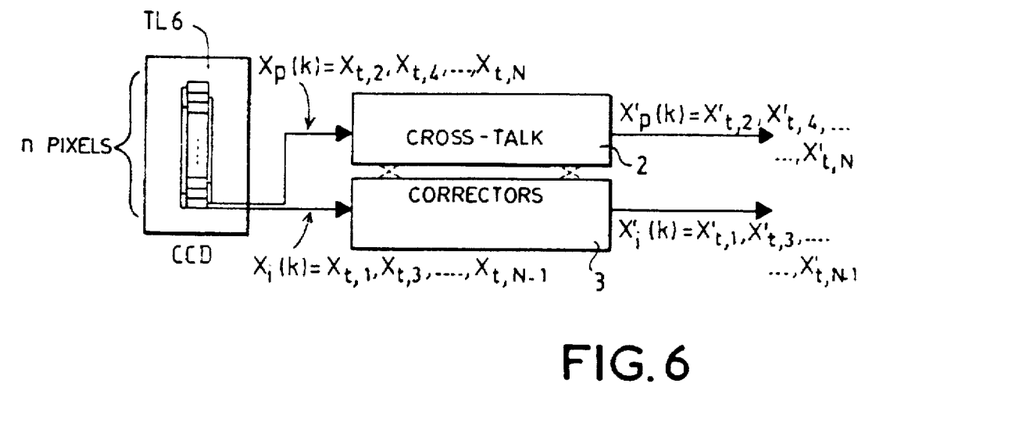
FIG. 6 shows an exemplary embodiment of the system of the invention.

Referring to FIG. 6, a description shall now be given of a simplified cross-talk correction system according to the invention. To process this double flux, the invention uses a cross-talk correction circuit 2 for the even-parity train and a cross-talk circuit 3 for the odd-parity train. Each circuit is essentially the same as the one already developed for the system of a single train.

However, since there is need, at the input of the correction operator, for at least three samples corresponding to a central track and to its neighbors to the right and to the left, it is necessary to have available samples of the neighboring tracks which, for their part, belong to a train different from that of the sample of the central track. The correction circuits will then have to manage the intersecting passageways between the trains of samples to have accurate information available at the appropriate instant.

Figure 7A:
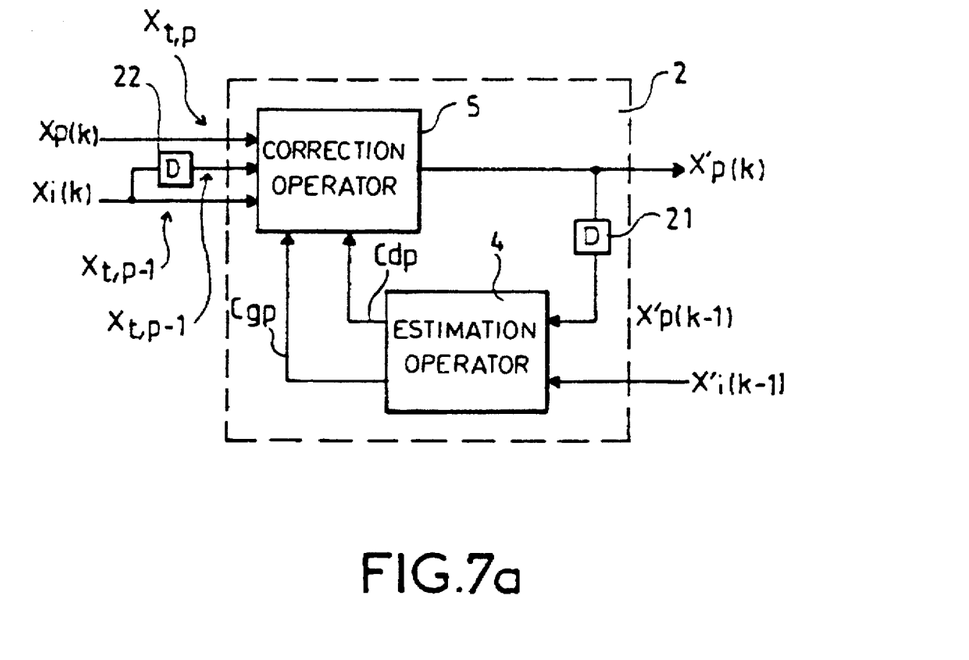
FIGS. 7a and 7b show an exemplary embodiment of the even-parity and odd-parity correction circuit.
Figure 7B:
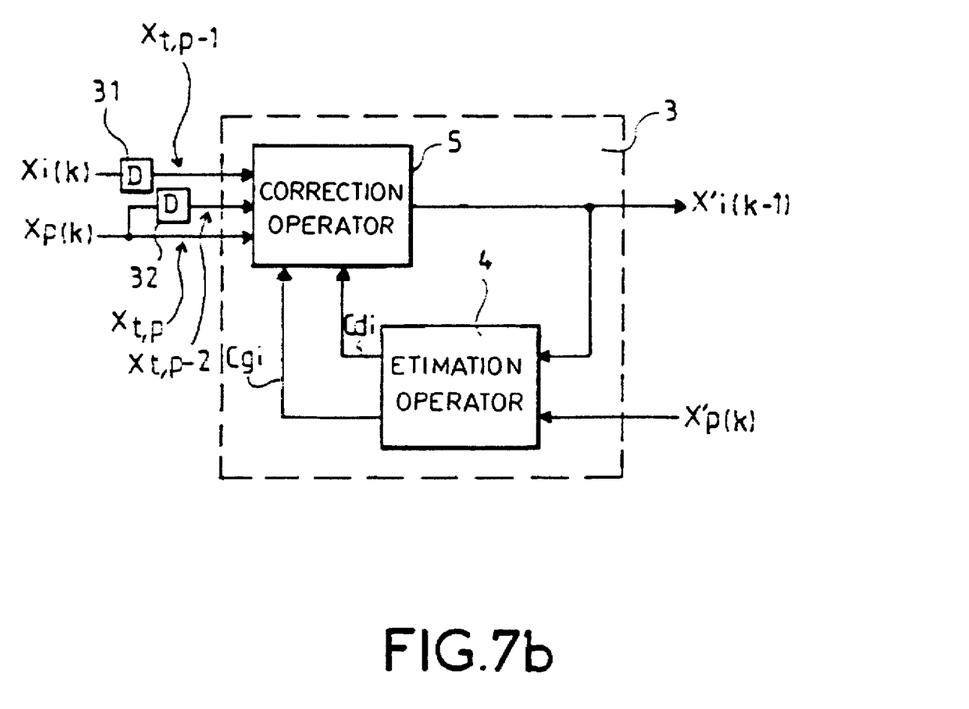

The detailed structure of the new even-parity correctors 2 and odd-parity correctors 3 are seen in FIGS. 7a and 7b respectively. The difference between the two circuits relating to the position of a delay operator 21 is inherent in the structure of the duplicated input flux and the relative position of each sample.

We shall consider first of all the case where the sample $Xt,p$ is corrected. It may be recalled that, to obtain knowledge of the cross-talk undergone by a track, the information elements coming from the neighboring tracks, in this case the samples $Xt,p-1$ and $Xt,p+1$, are considered. These information elements are boxed by lines of dashes in FIG. 4. Furthermore, it can be seen in FIG. 5 that the sample $Xt,p$ is in the even-parity train $Xp(k)$ at the rank k while samples $Xt,p-1$ and $Xt,p+1$ are in the odd-parity train $Xi(k)$ at the ranks k−1 and k respectively. These information elements are indicated by the lines of dashes in FIG. 5. The correction of cross-talk takes place in the even-parity correction circuit of FIG. 7a which should also have available the odd-parity train Xi(k). The delay operator 22 gives, at the rank k, the sample Xt,p−1 belonging to the previous rank k−1. In this way, for the input signals Xp(k) and Xi(k) at the rank k, the correction operator input 5 has available samples Xt,p−1, Xt,p and Xt,p+1 needed to correct the cross-talk on the sample Xt,p at the rank k.

Similarly, to correct the sample Xt,p−1 which is in the odd-parity train Xi(k) at the rank k−1, it is necessary to have available the samples Xt,p−2 and Xt,p which are in the even-parity train Xp(k) at the ranks k−1 and k respectively. These information elements are indicated by lines of dots and dashes in FIGS. 4 and 5. The correction of cross-talk takes place in the odd-parity correction circuit of FIG. 7b which should also have the even-parity train Xp(k) available. The delay operators 31 and 32 give the samples Xt,p−1 and Xt,p−2 respectively at the rank k. These samples belong to the previous rank k−1. In this way, for the input signals Xp(k), Xi(k) at the rank k, the correction operator input 5 has available the samples. Xt,p−2, Xt,p−1 and Xt,p which are needed to correct the cross-talk on the sample Xt,p−1 at the rank k−1. The odd-parity correction circuit 3 therefore works one rank behind the even-parity correction circuit 2. The operation of the correction operator 5 and estimation operator 4 is based on the above-mentioned French patent application 92-15474. In particular, the cross-talk correction operator 5 receives the cross-talk coefficients Cg and Cd and carries out the correction of cross-talk of a signal Xp(k) or Xi(k) by carrying out the following operation:

X'p(k)=Xp(k)−(Cdp·Xi(k)+Cgp·Xi(k−1)) for the even-parity circuit

X'i(k)=Xi(k)−(Cdi·Xp(k+1)+Cgi·Xp(k)) for the odd-parity circuit

Cdp, Cgp, Cdi and Cgi are the cross-talk coefficients computed by the estimation operator 4 which represents the cross-talk that may exist in the samples of the even-parity track (p) or odd-parity track (i) due to the samples located on the track to its right (d) or left (g) on the tape by observing it in the direction of its shift.

Figure 8:
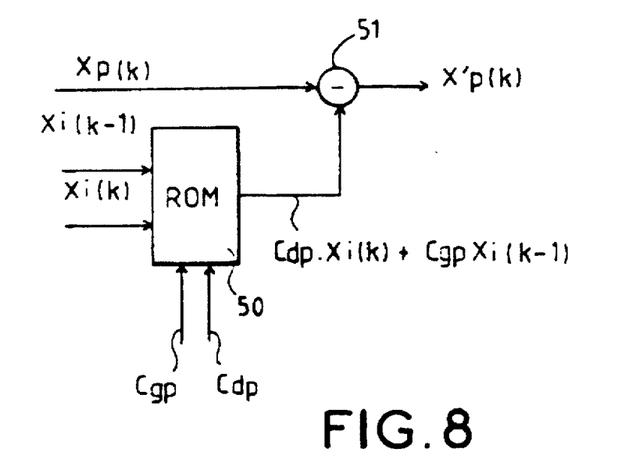
FIG. 8 shows an exemplary embodiment of the correction operator.
Figure 9:
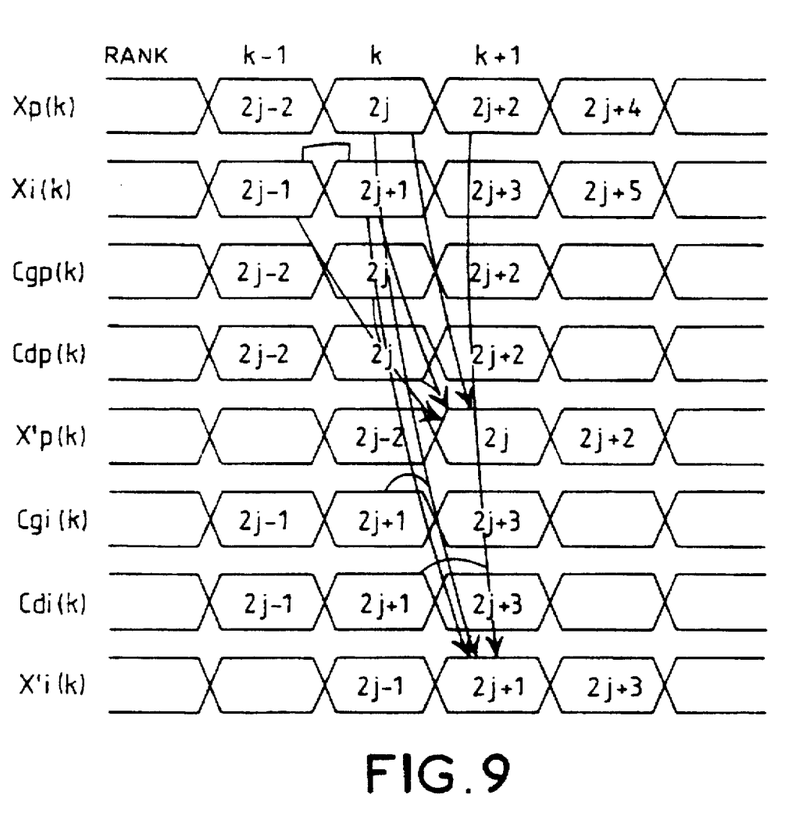
FIG. 9 shows the sequencing of the data elements and of the computations in the correction operator.

FIG. 8 shows an exemplary embodiment of the correction operator 5 for the even-parity correction circuit 2 (the correction circuit of the odd-parity circuit differs therefrom only in the indices). This circuit has a ROM type circuit 50 that receives the cross-talk coefficients Cgp and Cdp as well as the signals Xi(k−1) and Xi(k) and gives the value of the expression Cdp·Xi(k)+Cgp·Xi(k−1) at output. This result is transmitted to the subtraction circuit 51 which takes the difference between this result and the value of the signal Xp(k). We thus obtain the cross-talk corrected signal X'p(k). FIG. 9 shows the sequencing of the data elements and computations in these operators.

The cross-talk estimation operator 4 is connected at output to the cross-talk correction circuit 5 (FIGS. 7a and 7b) and it estimates the above-described cross-talk coefficients. The instantaneous value of left-hand cross-talk Cgp or Cgi is estimated by multiplying the value of a sample by the sign of the sample located to its left. Similarly, the value of the right-hand cross-talk Cdp or Cdi is estimated by multiplying the value of a sample by the sign of the sample located to its right. Thus we obtain:

Edp=X'p(k−1) * Sgn[X'i(k−1)] and

Egp=X'p(k−1) * Sgn[X'i(k−2)] for the even-parity train, and

Edi=X'i(k−1) * Sgn[X'p(k)] and

Egi=X'i(k−1) * Sgn[X'p(k−1)] for the odd-parity train.

The delay operator 21 is needed to ensure that the estimation operator 4, in the even-order correction circuit 2, works at the rank k−1 in order to use the information from the odd-parity correction circuit which works at this rank. The estimation operator 4 may be made with a ROM type circuit.

In fact, since the cross-talk estimation operator 4 is connected to the output of the cross-talk correction operator 5, the cross-talk estimation operator carries out an estimation of the residual cross-talk of a signal assumed to have been already corrected for cross-talk. This means that the cross-talk values computed here above are residual cross-talk values.

Figure 10A:
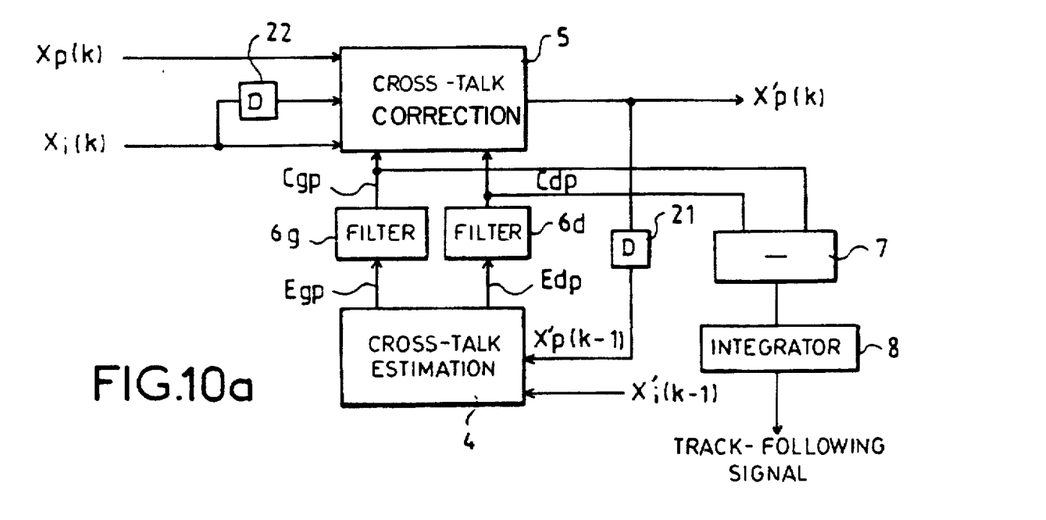
FIGS. 10a to 10c show an alternative embodiment of the correction circuit.

FIG. 10a shows a preferred alternative embodiment of the cross-talk corrector 2 or 3 according to the invention. In this circuit, which can be applied to the even-parity cross-talk corrector 2 (the corrector of the odd-parity circuit differs therefrom only in the indices), the residual cross-talk coefficients are transmitted to integrating filters 6g and 6d. These filters continuously integrate the cross-talk coefficients. The operation performed by the integrating filters is as follows:

Cgp(t)=Cgp(t−1)+E'egp, and

Cdp(t)=Cdp(t−1)+E'edp

Namely, in the frame at the instant t, the new estimated value of the cross-talk coefficient Cgp or Cdp is equal to the value in the frame at the instant t−1 corrected by a fraction k' of the residual error egp or edp. Here, the cross-talk coefficients of the previous embodiment have been renamed residual errors in the present embodiment.

Figure 10B:
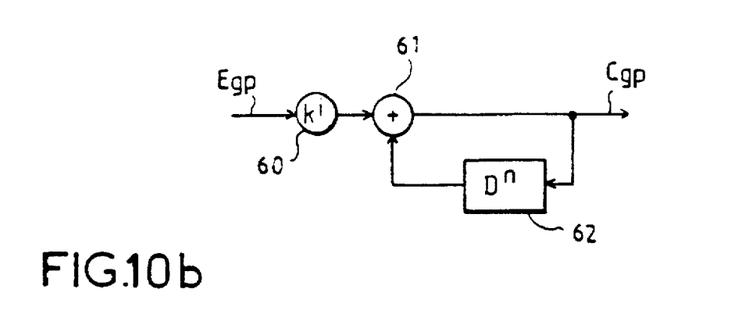
Figure 10C:
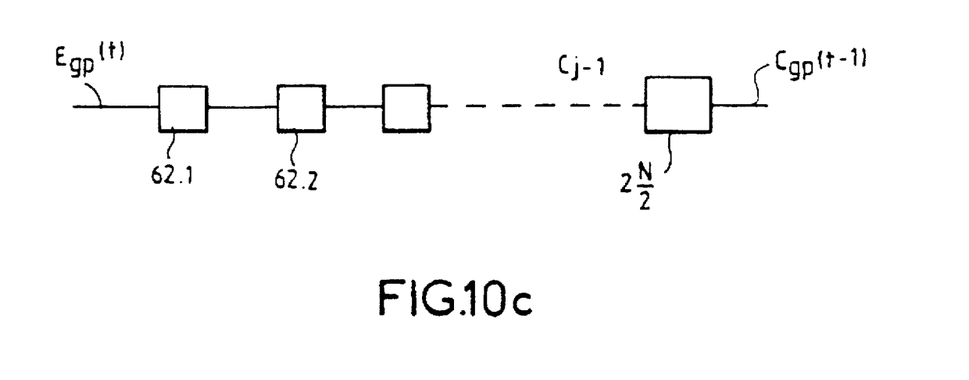

FIG. 10b shows an exemplary embodiment of these filters. A circuit 60, by means of a coefficient k' (smaller than 1), weights the residual cross-talk coefficient egp. The weighted coefficient is transmitted to an input of an addition circuit 61 whose output is looped to another input by a memory circuit 62. This memory circuit 62 is formed, for example, like the one shown in FIG. 10c. It can therefore be seen that the residual cross-talk coefficient egp, weighted by the coefficient k', is added to the value of the cross-talk coefficient computed earlier for the same track.

Figure 11:
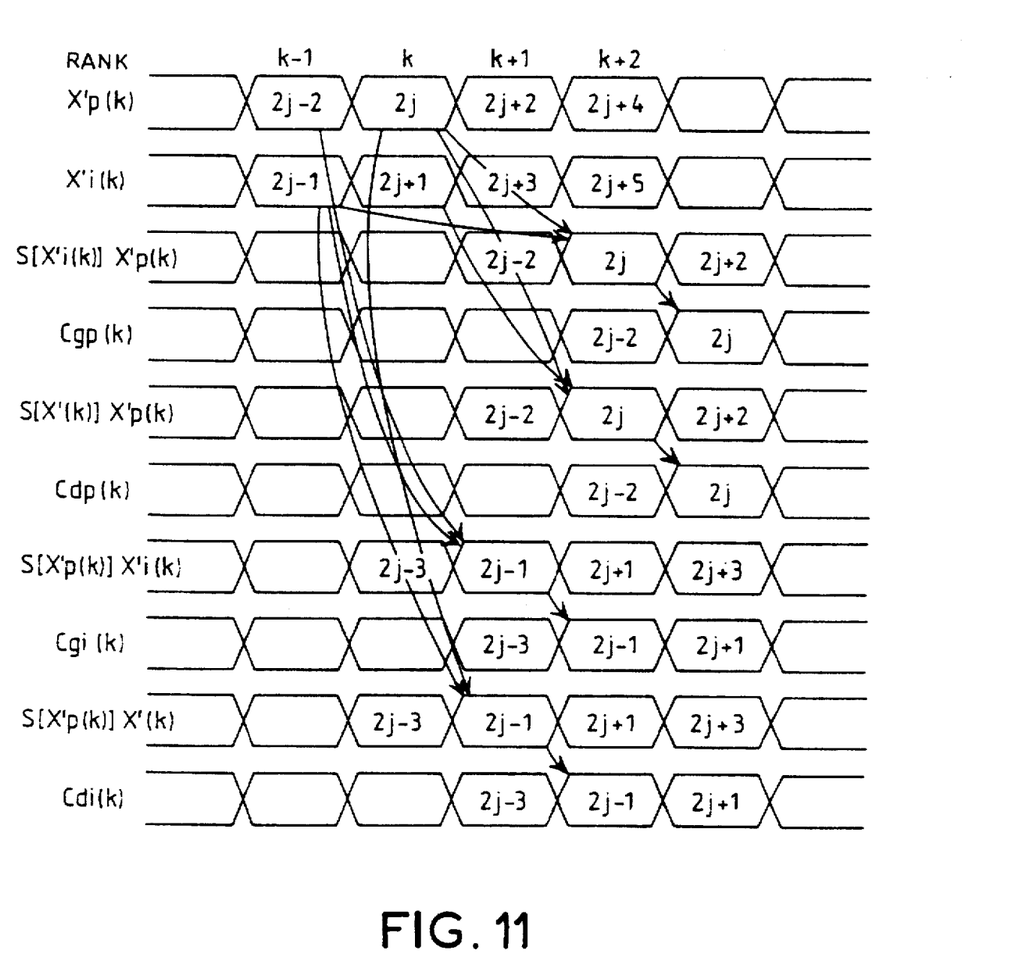
FIG. 11 shows the sequencing of the data elements and of the computations in the estimation operator.

After the filtering of this instantaneous error, the coefficients are available after a step of memorization needed to put them in phase for new correction computation. It is because the cross-talk does not change between different samples or changes very little that it is possible to correct the samples by using the computed coefficients of the information from another period. FIG. 11 shows the sequencing of the data elements and the computations in these operators.

Furthermore, the circuit of FIG. 10a also enables the computation of a track-following signal to control the track-following device TL5 described here above or the respective positions of the detector TL6, the optical system TM4 and the transducer TL1. This is done by means of a subtraction circuit 7, connected to the outputs of the filters 6g and 6d, that takes the difference between the cross-talk coefficients. To prevent any sudden variation of the cross-talk coefficients from having an immediate effect on the track-following device, the difference Cgp-Cgd is integrated with the n tracks possessed by the recording medium. A track-following signal is obtained. The average of this track-following signal may be taken for all the tracks to give a result that is unaffected by the phenomena affecting one particular track.

Figure 12:
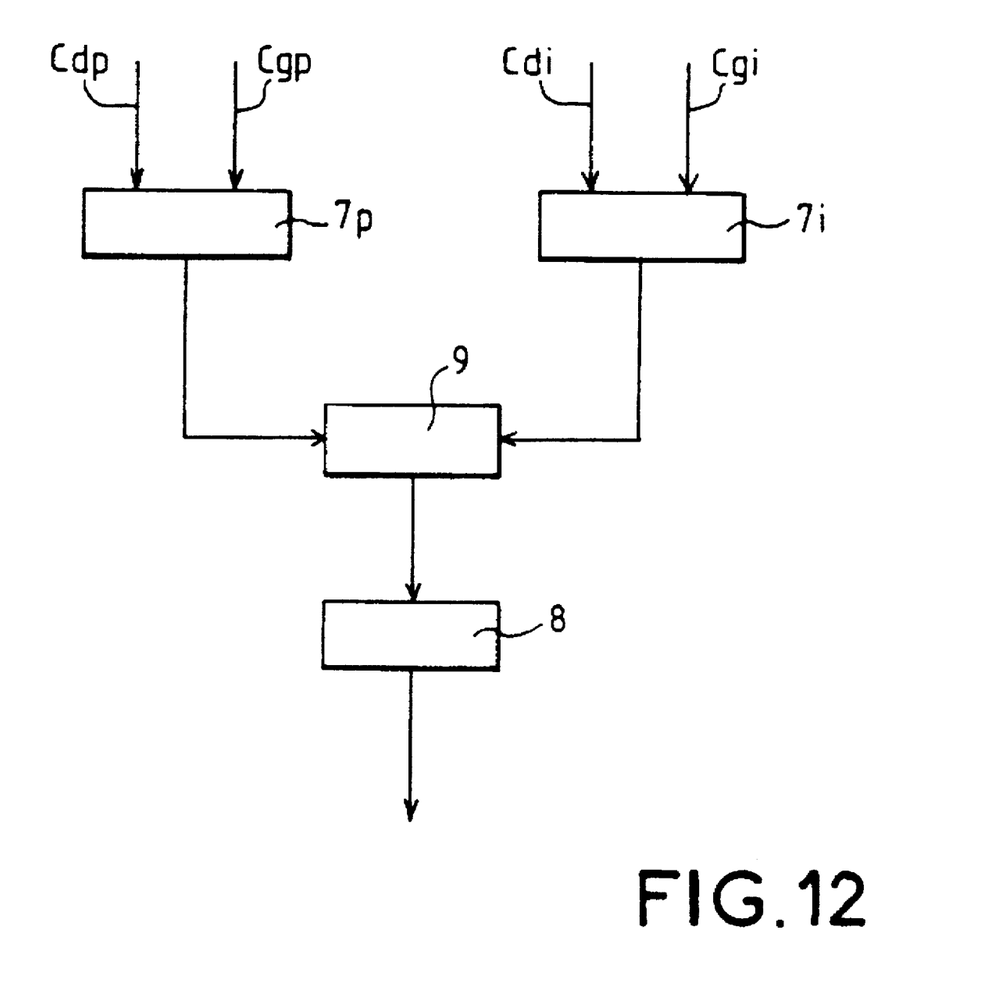
FIG. 12 shows a circuit for the preparation of the track-following signal.

More specifically, since the system of the invention computes the even-parity and odd-parity cross-talk coefficients (Cgp, Cdp, Cgi, Cdi), it is appropriate to carry out the integration on all these coefficients. This is why, as shown in FIG. 12, there are provided two subtraction circuits 7i and 7p that respectively take the differences Cgi-Cdi and Cgp-Cdp. A multiplexer reader 9 reads the outputs of the subtraction circuits 7i and 7p alternately and sends the integrator 8 the differences Cgi-Cdi and Cgp-Cdp alternately. The track-following signal is therefore obtained from a mean value based on the even-parity and odd-parity cross-talk coefficients.

The invention has been described in application to the reading of a magnetic tape. However, it can be applied to the reading of any information medium (tapes, disks, cards, etc.) that can be read by any means (magnetic means, magneto-resistive means, optical means, etc.). Furthermore, in the above description, the information elements to be read are organized in the form of tracks but the invention can also be applied to the reading of information elements organized in the form of independent frames or even a single frame.

What is claimed is:

1. A device for reading a record medium having at least one frame of information segments arranged side by side in alternating odd and even positions, said device comprising:

a reading head for carrying out parallel reading of said frame of information segments with a first group of reading elements that are arranged to read only odd position information segments to produce an odd signal train and a second group of reading elements that are arranged to read only even position information segments to produce an even signal train;

a first cross-talk correction circuit including first input circuitry connected to receive each of the odd and even signal trains, said first input circuitry supplying first cross-talk correction circuit inputs with an odd target signal segment that corresponds to an odd target information segment of said frame along with two adjacent even signal segments from the even signal train that correspond to even information segments of said frame which are adjacent to the odd target information segment, said first cross-talk correction circuit providing a cross-talk corrected odd output signal stream of cross-talk corrected odd target signal segments;

a second cross-talk correction circuit including second input circuitry connected to receive each of the odd and even signal trains, said second input circuitry supplying second cross-talk correction circuit inputs with an even target signal segment that corresponds to an even target information segment of said frame along with two adjacent even signal segments from the odd signal train that correspond to odd information segments of said frame which are adjacent to the even target information segment, said second cross-talk correction circuit providing a cross-talk corrected even output signal stream of cross-talk corrected even target signal segments.

2. A device as claimed in claim 1, wherein each of the cross-talk correction circuits further comprises:

an estimation operator with inputs for receiving each one of the cross-talk corrected output signal streams, said estimation operator computing residual cross-talk coefficients indicating a degree of residual cross-talk between a particular output target signal segment at one of the estimation operator inputs and each of two associated output adjacent signal segments at another of the estimation operator inputs; and a cross-talk correction operator connected to the estimation operator to receive the residual cross-talk coefficients computed thereby and further connected to receive a target signal segment to be cross-talk corrected and associated adjacent signal segments, and providing the respective cross-talk corrected output streams of the respective cross-talk correction circuits.

3. A device as claimed in claim 2, wherein each of the estimation operators in each of the cross-talk correction circuits further comprises:

a first means that computes a first one of the residual cross-talk coefficients by multiplying the value of a said particular output target signal segment by +1 if one of said associated adjacent signal segments with a first orientation has a + value and by −1 if said one of said associated adjacent signal segments with said first orientation has a − value; and a second means that computes a second one of the residual cross-talk coefficients by multiplying the value of a said particular output target signal segment by +1 if one of said associated adjacent signal segments with a second orientation has a + value and by −1 if said one of said associated adjacent signal segments with said second orientation has a − value.

4. A device as claimed in claim 3, wherein each of the estimation operators further includes filtering circuits for continuously integrating each of the first and second residual cross-talk coefficients.

5. A device as claimed in claim 4, wherein plural frames of correspondingly aligned information segments are provided in a side-by-side manner on the record medium so that each of the aligned information segments form a series of segments extending in a direction perpendicular to that of the plural frames.

6. A device according to claim 5, further comprising:

a subtraction circuit connected to receive both of the computed residual cross-talk coefficients from at least one of the estimation operators in at least one of a cross-talk correction circuits to determine a difference signal;

a positioning controller connected to receive said difference signal and responsive thereto to control a relative reading position of the reading head including each of the reading elements therein so that each of said reading elements reads an information segment having the same relative aligned position in each of said frames being read.

7. A device according to claim 5, further comprising:

a subtraction circuit connected to receive both of the computed residual cross-talk coefficients from the estimation operators in both said first and second cross-talk correction circuits to determine a difference signal;

a multiplexer receiving both of the difference signals and alternatively supplying said difference signals to an integrator circuit; and a positioning controller connected to receive an output from the integrator circuit and responsive thereto to control a relative reading position of the reading head including each of the reading elements therein so that each of said reading elements reads an information segment having the same relative aligned position in each of said frames being read.

8. A device as claimed in claim 4, wherein each of the filtering circuits further comprises:

a weighting circuit for weighting each of the residual cross-talk coefficients by a further coefficient having a value less than 1 to form a weighted residual cross-talk coefficient;

a memory storing a residual cross-talk coefficient value determined from a previous cycle of operation;

an adder circuit receiving said weighted residual cross-talk coefficient and an output from said memory; and wherein said adder output is applied to said memory to provide an update of the stored residual cross-talk coefficient value during each cycle of operation.

9. A device as claimed in any one of claims 1, 2, 3, 4, 5, 6, 7, or 8, further comprising:

an optical means to transmit an optical beam to said record medium to interact with and be modulated by the frame of information segments carried thereby; and said reading head reading elements being optical detecting elements that receive the modulated beam from the record medium so as to produce said odd and even signal trains.

* * * * *